(12) United States Patent
Park et al.

(10) Patent No.: US 11,169,774 B2
(45) Date of Patent: Nov. 9, 2021

(54) ELECTRONIC APPARATUS AND CONTROL METHOD THEREOF

(71) Applicant: Samsung Electronics Co., Ltd., Suwon-si (KR)

(72) Inventors: Ji Hun Park, Suwon-si (KR); Myung Jae Kim, Suwon-si (KR); Hyun Don Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/757,976

(22) PCT Filed: Nov. 1, 2018

(86) PCT No.: PCT/KR2018/013190
§ 371 (c)(1),
(2) Date: Apr. 21, 2020

(87) PCT Pub. No.: WO2019/093716
PCT Pub. Date: May 16, 2019

(65) Prior Publication Data
US 2020/0341726 A1 Oct. 29, 2020

(30) Foreign Application Priority Data
Nov. 10, 2017 (KR) ........................ 10-2017-0149907

(51) Int. Cl.
*G06F 3/16* (2006.01)
*G06F 9/451* (2018.01)
(Continued)

(52) U.S. Cl.
CPC ............ *G06F 3/167* (2013.01); *G06F 3/0487* (2013.01); *G06F 9/451* (2018.02); *G10L 15/22* (2013.01);
(Continued)

(58) Field of Classification Search
None
See application file for complete search history.

(56) References Cited

U.S. PATENT DOCUMENTS 7,379,876 B2 * 5/2008 Nakata ................ G06F 3/04812
701/36
9,582,246 B2 2/2017 Klein et al.
(Continued)

FOREIGN PATENT DOCUMENTS

WO WO 2014/008208 1/2014

OTHER PUBLICATIONS

International Search Report dated Feb. 25, 2019, in corresponding International Patent Application No. PCT/KR2018/013190.

*Primary Examiner* — Stella L. Woo
(74) *Attorney, Agent, or Firm* — Staas & Halsey LLP

(57) ABSTRACT

An electronic apparatus according to an embodiment includes an input receiver configured to receive a user input; a voice receiver configured to receive a voice command; a processor configured to control to, based on a user input corresponding to an execution of a certain function of the electronic apparatus being received instead of an utterance of a first voice command corresponding to the execution of the certain function, carry out the certain function and carry out a guide operation for the utterance of the first voice command.

14 Claims, 10 Drawing Sheets

(51) Int. Cl.
*G06F 3/0487* (2013.01)
*G10L 15/22* (2006.01)

(52) U.S. Cl.
CPC .. *G10L 2015/223* (2013.01); *G10L 2015/225* (2013.01)

(56) References Cited

U.S. PATENT DOCUMENTS

| | | | |
|---|---|---|---|
| 2003/0065515 A1* | 4/2003 | Yokota | G01C 21/3608 704/270 |
| 2005/0154985 A1 | 7/2005 | Burkhart et al. | |
| 2008/0282204 A1* | 11/2008 | Del Valle Lopez | G06F 9/453 715/866 |
| 2013/0033643 A1 | 2/2013 | Kim et al. | |
| 2015/0254058 A1* | 9/2015 | Klein | G06F 3/167 704/275 |
| 2015/0310865 A1* | 10/2015 | Fay | G10L 15/01 704/254 |

\* cited by examiner

ELECTRONIC APPARATUS AND CONTROL METHOD THEREOF

CROSS-REFERENCE TO RELATED APPLICATIONS

This application is a U.S. National Stage Application which claims the benefit under 35 U.S.C. § 371 of International Patent Application No. PCT/KR2018/013190 filed on Nov. 1, 2018, which claims foreign priority benefit under 35 U.S.C. § 119 of Korean Patent Application No. 10-2017-0149907 filed on Nov. 10, 2017 in the Korean Intellectual Property Office, the contents of both of which are incorporated herein by reference.

TECHNICAL FIELD

Apparatuses and methods consistent with embodiments relate to an electronic apparatus and a control method thereof, and more particularly, an electronic apparatus and a control method thereof, which can provide a guide to induce a use of a voice service.

BACKGROUND ART

With development of voice recognition and intent analysis technologies in recent years, voice based interface means are widely being used in various devices, such as a television (TV), a smart phone, etc. and use scope thereof is also being diversified into various areas, such as search, device control, agent function, etc.

However, an actual use rate of voice service is very low. This is attributed to that users do not easily get information about what functions to apply to the voice service and whether to utter what type sentences to execute the functions.

With development of conversation processing and analysis technologies, utterance may be analyzed in more various patterns now than before, but there is a limit in analyzing various types of sentences uttered by many users. In other words, since it can be guaranteed to carry out desired operations only by uttering in somewhat stereotyped patterns, it is required to provide a guide for using the voice service.

Related art devices that support the voice service provide helps or advices, such as utterance examples, support range and use method of the voice service, etc. However, the related art devices have a structure possible only for active users, who look for the helps to use the voice service, to access the helps.

Also, some related art devices often provides utterance examples operable when the voice service is enabled or activated or random utterance examples, but also provides the utterance examples only for users using the voice service.

DISCLOSURE

Technical Problem

Embodiments provide an electronic apparatus, which allows a user to facilitate an access to a voice service, and a control method thereof.

Also, the embodiments provide an electronic apparatus, which induces a proper use of a voice service even in a situation where a user does not use the voice service, and a control method thereof.

Technical Solution

According to an embodiment, an electronic apparatus includes: an input receiver configured to receive a user input; a voice receiver configured to receive a voice command; a display; and a processor configured to control to, based on a user input corresponding to an execution of a certain function of the electronic apparatus being received instead of an utterance of a first voice command corresponding to the execution of the certain function, carry out the certain function and carry out a guide operation for the utterance of the first voice command.

With this, if a user are executing the certain function by other means than voice, she or he may be induced to experience a voice service. Also, a proper guide may be provided to a user who does not know how to use the voice service and thereby does not use the voice service.

The processor may be configured to identify whether the guide operation is to be carried out based on at least one of an utterance history of the first voice command or a performance history of the guide operation. Accordingly, voice use or guide provision histories may be managed, thereby providing a guide for voice service in an appropriate circumstance to the user.

The processor may be configured to, based on the first voice command being not uttered after the performance of the guide operation, identify whether the guide operation is to be continuously carried out or terminated based on a number of times that the certain function has been carried out by the user input. Accordingly, if there is no use history with respect to the voice service, histories of the certain function executed by other means than voice, such as a remote control or the like may be referred to provide the guide for voice service when the user is likely to use the voice service.

The processor is configured to, based on the first voice command being not uttered after the performance of the guide operation, identify whether the guide operation is to be continuously carried out or terminated based on a number of times that the guide operation has been carried out. Accordingly, if there is no use history with respect to the voice service, guide provision histories may be referred to provide the guide for voice service when the user is likely to use the voice service.

The processor may be configured to initialize a number of times that the certain function has been carried out by the user input or a number of times that the guide operation has been carried out. Accordingly, if the user does not use the voice service even though the guide for voice service is provided, histories managed to provide the guide for voice service may be initialized at a proper time.

The processor may be configured to, based on the certain function being carried out according to the utterance of the first voice command after the performance of the guide operation, identify whether the guide operation is to be carried out based on a time elapsed after the utterance of the first voice command. Accordingly, if a given time elapses after the user has used the voice service according the guide provision, the guide for voice service may be provided and used again.

The processor may be configured to identify the utterance history of the first voice command or the performance history of the guide operation according to users. Accordingly, the voice use or guide provision histories may be managed according to users, thereby providing the guide for voice service in an appropriate time to each user.

The apparatus may further include a communicator configured to communicate with a server, and the processor may be configured to, based on information received from the server, identify whether there is the utterance history of the first voice command or the performance history of the guide operation. Accordingly, the histories referred to provide the guide for voice service may be managed in the server, thereby distributing operations for providing the guide for voice service to the server and the electronic apparatus, for example, TV to process them.

The apparatus may further include a communicator configured to communicate with a server, and the processor may be configured to transmit information on the at least one of the utterance history of the first voice command or the performance history of the guide operation to the server. Accordingly, the histories referred to provide the guide for voice service may be managed to transmit information about the histories to the server, so that the server identifies whether to provide the guide for voice service based on the transmitted information.

The apparatus may further include a display, and the processor may be configured to, based on the user input corresponding to the execution of the certain function being received, control the display to display an image of the certain function. Accordingly, at the apparatus including the display, such as a TV or the like, if the user are executing the certain function by other means than voice, she or he may be induced to experience the voice service.

According to an embodiment, a computer program product includes: a memory configured to store instructions; and a processor, wherein when being executed by the processor, the instructions are configured to, based on a user input corresponding to an execution of a certain function of the electronic apparatus being received instead of an utterance of a first voice command corresponding to the execution of the certain function, display an image of the certain function and carry out a guide operation for the utterance of the first voice command.

With this, if a user are executing the certain function by other means than voice, she or he may be induced to experience a voice service. Also, a proper guide may be provided to a user who does not know how to use the voice service and thereby does not use the voice service.

The instructions may be configured to identify whether the guide operation is to be carried out based on at least one of an utterance history of the first voice command or a performance history of the guide operation. Accordingly, voice use or guide provision histories may be managed, thereby providing a guide for voice service to the user in an appropriate circumstance.

According to an embodiment, a control method of an electronic apparatus includes: receiving a user input corresponding to an execution of a certain function of the electronic apparatus instead of an utterance of a first voice command corresponding to the execution of the certain function; displaying an image of the certain function; and carrying out a guide operation for the utterance of the first voice command.

With this, if a user are executing the certain function by other means than voice, she or he may be induced to experience a voice service. Also, a proper guide may be provided to a user who does not know how to use the voice service and thereby does not use the voice service.

The carrying out the guide operation may include identifying whether the guide operation is to be carried out based on at least one of an utterance history of the first voice command or a performance history of the guide operation. Accordingly, voice use or guide provision histories may be managed, thereby providing a guide for voice service in an appropriate circumstance to the user.

The method may include, based on the first voice command being not uttered after the performance of the guide operation, identifying whether the guide operation is to be continuously carried out or terminated based on a number of times that the certain function has been carried out by the user input. Accordingly, if there is no use history with respect to the voice service, histories of the certain function executed by other means than voice, such as a remote control or the like may be referred to provide the guide for voice service when the user is likely to use the voice service.

The method may include, based on the first voice command being not uttered after the performance of the guide operation, identifying whether the guide operation is to be continuously carried out or terminated based on a number of times that the guide operation has been carried out. Accordingly, if there is no use history with respect to the voice service, guide provision histories may be referred to provide the guide for voice service when the user is likely to use the voice service.

The method may include initializing a number of times that the certain function has been carried out by the user input or a number of times that the guide operation has been carried out. Accordingly, if the user does not use the voice service even though the guide for voice service is provided, histories managed to provide the guide for voice service may be initialized at a proper time.

The method may include, based on the certain function being carried out according to the utterance of the first voice command after the performance of the guide operation, identifying whether the guide operation is to be carried out based on a time elapsed after the utterance of the first voice command. Accordingly, if a given time elapses after the user has used the voice service according the guide provision, the guide for voice service may be provided and used again.

The method may include identifying the utterance history of the first voice command or the performance history of the guide operation according to users. Accordingly, the voice use or guide provision histories may be managed according to users, thereby providing the guide for voice service in an appropriate time to each user.

The method may include communicating with a server, and based on information received from the server, identifying whether there is the utterance history of the first voice command or the performance history of the guide operation. Accordingly, the histories referred to provide the guide for voice service may be managed in the server, thereby distributing operations for providing the guide for voice service to the server and the electronic apparatus, for example, TV to process them.

The method may include communicating with a server, and transmitting information on the at least one of the utterance history of the first voice command or the performance history of the guide operation to the server. Accordingly, the TV may manage histories referred to provide the guide for voice service to transmit information about the histories to the server, so that the server decides whether to provide the guide for voice service based on the transmitted information.

Advantages Effects

As described above, according to the embodiments, the electronic apparatus and the control method thereof may allow the user to facilitate an access to the voice service, thereby increasing a use rate of the voice service.

Also, according to the embodiments, the electronic apparatus and the control method thereof may induce a proper use of the voice service even in a situation where the user does not use the voice service.

BEST MODE

Below, embodiments will be described in detail with reference to accompanying drawings for those skilled in the art to work the present disclosure without difficulty. The embodiments may be achieved in various forms, and are not limited to the embodiments provided herein.

Figure 1:
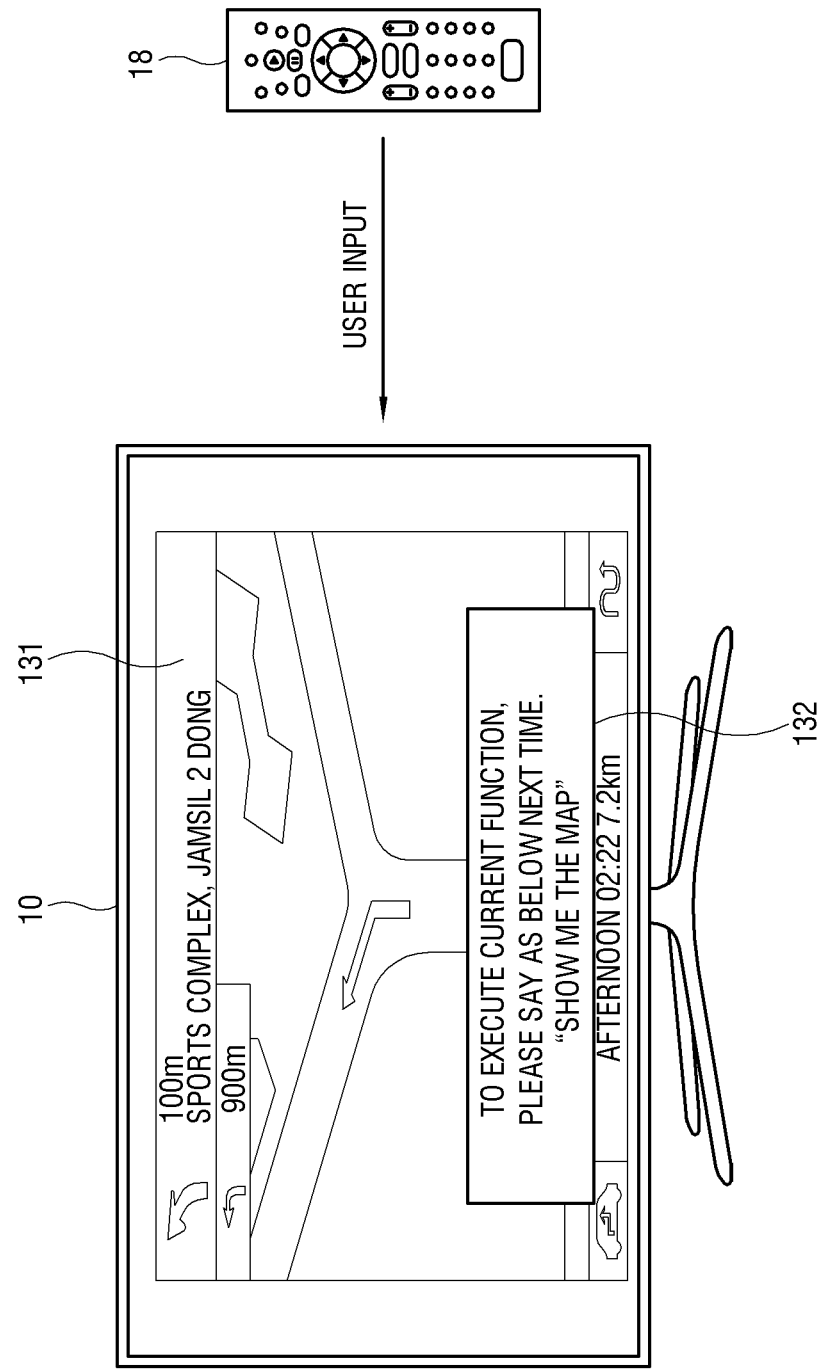
FIG. 1 is a schematic diagram showing an operation of an electronic apparatus according to an embodiment.

FIG. 1 is a schematic diagram showing an operation of an electronic apparatus according to an embodiment. As shown in FIG. 1, the electronic apparatus 10 receives a user input from a remote control 18, and displays an image of a certain or predetermined function corresponding to the received user input from among a plurality of functions providable by the electronic apparatus 10. Here, the electronic apparatus 10 may be implemented as a product having a display, such as, for example, a television (TV), a smart phone, a tablet personal computer (PC), a PC, a set top box with a small display, etc.

However, the electronic apparatus 10 is not limited to the embodiment shown in FIG. 1, and may be implemented as a product not having a display, such as, for example, a set top box configured to receive an image signal to provide to the TV, a general household electrical appliance, an Internet of Things (IoT) device, an automobile, a drone, etc.

In the shown embodiment, when an image 131 of a certain function is displayed according to the user input by the remote control 18, the electronic apparatus 10 displays a guide image 132 informing that a voice command can be used or uttered to execute the certain function.

The guide image 132 includes information about an utterance example of the voice command for displaying the image 131 of the certain function, a method of triggering a voice service, etc.

In the shown example, an image of 'a map application' is displayed according to the user input through the remote control 18, and a guide image 132 providing 'Please show me the map' is displayed as an utterance example of the voice command, which is able to execute the map application.

As another example, when a 'TV mirroring' command and a 'motion image playback' command are executed by touch inputs via a smart phone (not shown) of the user instead of the remote control 18, a motion image content, which is currently playing in the smart phone, is displayed on the electronic apparatus, for example, the TV. At this time, a voice guide of 'Please say "playback on the TV"' next time', which is an utterance example of the voice command capable of executing the 'TV mirroring' and 'motion image playback' function, may be output through a speaker.

As other example, if the electronic apparatus 10 is implemented as an air conditioner, when a 'sleep mode' is selected via the remote control, the air conditioner carries out a cooling operation in a temperature corresponding to the 'sleep mode'. At this time, a voice guide of 'Please say "sleep mode" next time', which is an utterance example of the voice command capable of executing the 'sleep mode' function, may be output through the speaker.

As described above, if the user are executing the certain function by other means than voice, the electronic apparatus 10 according to the embodiment may induce to experience the voice service.

Hereinafter, a construction and an operation flow of the electronic apparatus 10 according to the embodiment will be described with reference to FIGS. 2 to 7.

Figure 2:
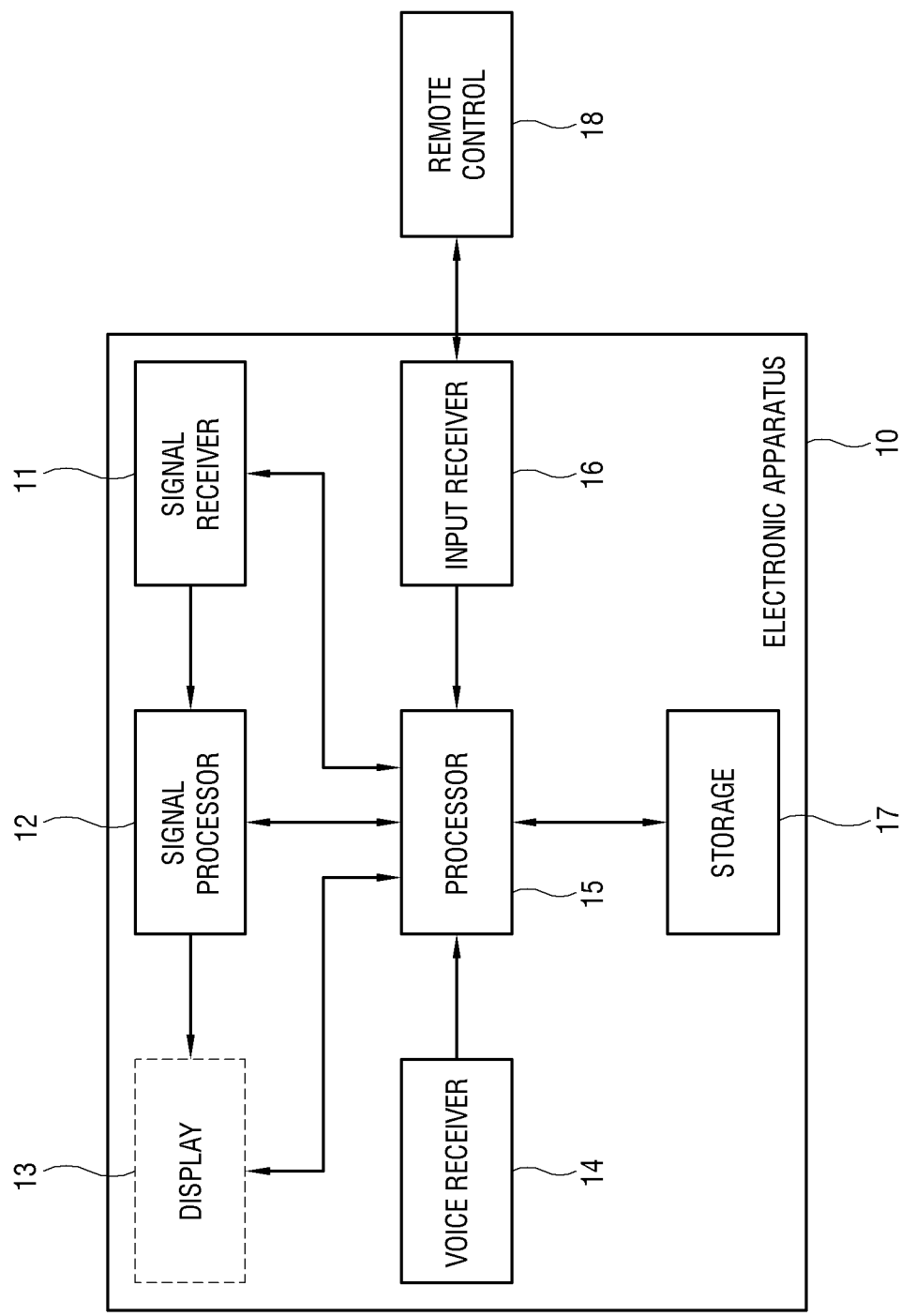
FIG. 2 is a block diagram showing a construction of an electronic apparatus according to an embodiment.

FIG. 2 is a block diagram showing the construction of the electronic apparatus according to an embodiment. As shown in FIG. 2, the electronic apparatus 10 includes a signal receiver 11, a signal processor 12, a voice receiver 14, a processor 15, an input receiver 16 and a storage 17. The electronic apparatus 10 may further include a display 13 and at this case, the electronic apparatus 10 may be implemented as a product, such as, for example, a TV, a smart phone, a tablet PC, a PC, a set top box with a small display, etc.

However, the electronic apparatus 10 is not limited to include the display 13, and may be implemented as a product not having the display, such as, for example, a set top box configured to receive an image signal to provide to the TV, a general household electrical appliance, an IoT device, an automobile, a drone, etc. Constructions included in the electronic apparatus 10 are not limited to the embodiment shown in FIG. 2, and may be implemented by excluding some elements therefrom or adding other elements therein.

If the certain function is executed by a user input other than the voice command, the electronic apparatus 10 according to an embodiment may provide a guide to the user to use the voice command.

The signal receiver 11 receives an image signal and an audio signal inputted from an outside. The image signal may include, for example, a video signal or a graphic signal. The signal receiver 11 may be provided in various forms according to standards of the received image signal and implemented types of the display apparatus 1. For example, the signal receiver 11 may be implemented as a tuner, which receive a radio frequency (RF) signal or a satellite signal transmitted from a broadcasting station. As another example, the signal receiver 11 may receive an image signal from a digital video disc (DVD) player, a game machine, a high definition multimedia interface (HDMI) of PC, etc.

The signal processor 12 carries out predetermined signal processing processes with respect to the image signal and the audio signal received in the signal receiver 11. As examples of the signal processing processes carried out by the signal processor 12, there are demultiplexing, decoding, de-interlacing, noise reduction, detail enhancement, etc. and the type thereof is not limited. The signal processor 12 may be implemented by a system on chip (SoC) in which various functions are integrated into a single chip, or an image processing board on which individual chipsets for independently performing processes are mounted.

The display 13 displays an image based on the image signal processed in the signal processor 12. Implementation type of the display 13 is not limited and may be implemented in various forms, such as plasma display panel (PDP), liquid crystal display (LCD), organic light emitting diodes (OLED), flexible display, etc.

The voice receiver 14 receives an input of audio, such as a voice command of the user. The voice receiver 14 may receive the voice command of the user from, for example, a microphone or the like built in the electronic apparatus 10 itself. At this time, the voice receiver 14 converts an analog signal corresponding to the received voice command of the user into a digital signal, and transmits the converted digital signal to the processor 15 to carry out a voice recognition operation through a voice recognition module.

As another example, the voice receiver 14 may receive a voice command via a microphone or the like provided in the remote control 18 or a mobile device (not shown), such as a smart phone or the like, which communicates with the electronic apparatus 10. In this case, the remote control 18 or the mobile device converts an analog signal corresponding to the voice command received via the microphone into a digital signal, and transmits the converted digital signal to the voice receiver 14 via a Bluetooth or the like. The voice receiver 14 transmits the digital signal of the voice command received from the remote control 18 or the mobile device to the processor 15 to carry out the voice recognition operation through the voice recognition module.

As an embodiment, the voice command received in the voice receiver 14 may not be processed in the electronic apparatus 10 itself, but transmitted and processed to and by a voice recognition server (not shown). The voice recognition server may be implemented as, for example, a speech to text (STT) server. In this case, the processor 15 transmits data of the voice command to the voice recognition server, so that the voice recognition server carries out the voice recognition operation to convert the data of the voice command into a text.

The data of the voice command processed in the voice recognition server as above may be transmitted to the electronic apparatus 10 again or another server to collect voice recognition results of the voice command. If the electronic apparatus 10 receives the text converted from the data of the voice command in the voice recognition server, the processor 15 controls to carry out a function of the electronic apparatus 10 corresponding to the converted text of the voice command.

At this time, the processor 15 may transmit information about the function of the electronic apparatus 10 corresponding to the converted text of the voice command to the voice recognition server or another server. Accordingly, the voice recognition server or the another server may store the information about the function corresponding to the voice recognition results of the voice command, and after that, if the data of the same voice command is received, provide the stored information to the electronic apparatus 10, so that the electronic apparatus 10 carries out the corresponding function based on the provided information.

The input receiver 16 receives a user input for controlling at least one function of the electronic apparatus 10. As an embodiment, if the electronic apparatus 10 is implemented as a display apparatus, the input receiver 16 may receive a user input for executing any one of a plurality of applications executable in the display apparatus. In addition, the input receiver 16 may receive a user input for selecting a portion of a user interface displayed on the display 13. Also, the input receiver 16 may receive a user input for controlling various functions of the electronic apparatus 10 including, for example, outer input conversions, basic operations such as channel operation, volume operation or the like, environment settings, menu selections, etc.

As an embodiment, if the electronic apparatus 10 is implemented as a product not having a display, such as, for example, a set top box, a general home appliance, a IoT device, an automobile, a drone, etc., the input receiver 16 may receive a user input for controlling the electronic apparatus 10, such as a basic operation command, a mode setting, an environment setting, etc. The input receiver 16 may receive a user input from the remote control 18 communicating by an infrared method with the electronic apparatus 10 or an input panel provided on an outside of the electronic apparatus 10. Also, the input receiver 16 may receive a user input from a keyboard, a mouse, or a touch screen, which is connected with or provided on the electronic apparatus 10.

As an embodiment, the input receiver 16 may receive a user input from a mobile device (not shown), which is communicated in Wi-Fi, Bluetooth or infrared method with the electronic apparatus 10. In this case, the mobile device may be implemented as a smart phone or the like, and may install, for example, a remote control application therein and execute the installed remote control application to transmit the user input through a button touch or the like for controlling the operation of the electronic apparatus 10.

The storage 17 is implemented as a nonvolatile memory, which can retain data regardless of whether a system power of the electronic apparatus 10 is turned on or off. The storage 17 stores a plurality of instructions for executing programs. The storage 17 is configured to perform reading, writing, editing, deleting, updating, etc. with regard to each of the plurality of stored instructions.

The storage 17 stores information about voice commands respectively usable with respect to a plurality of functions which is providable by the electronic apparatus 10. As an example, the storage 17 may store information about utterance examples of voice commands usable by the user to execute the certain application. The electronic apparatus 10 may provide the utterance examples of voice commands stored in the storage 17 to the user at an appropriate time to induce an utterance of the user.

The processor 15 carries out a control process for controlling a plurality of functions executable by the electronic apparatus 10. The processor 15 may be implemented as a central processing unit (CPU), and include three areas including a control area, a calculation area, and a register area. The control area interprets program command languages and instructs operations of respective elements in the electronic apparatus 10 according to the meaning of the interpreted program command languages. The calculation area carries out an arithmetic operation and a logic operation, and carries out calculations required to operate the respective elements in the electronic apparatus 10 according to the instructions of the control area. The register area, which is a memory location for storing information required while the CPU executes the command languages, stores command languages and data for the respective elements in the electronic apparatus 10, and stores the calculation results.

If the user input for executing the certain function from among the plurality of functions providable by the electronic apparatus 10 is received from the input receiver 16, the processor 15 control the display 13 to display an image of the certain function. At this time, the user input, which is received via input means besides the voice command, may be, for example, an execution command of the certain function received from the remote control 18.

If the image of the certain function is displayed according to the user input, the processor 15 controls to carry out a guide operation for utterance of the voice command corresponding to the certain function. For example, if a certain application is executed by the remote control 18, the processor 15 controls the display to provide a guide image 132 informing the user that the voice command can be used to execute the certain function.

Figure 3:
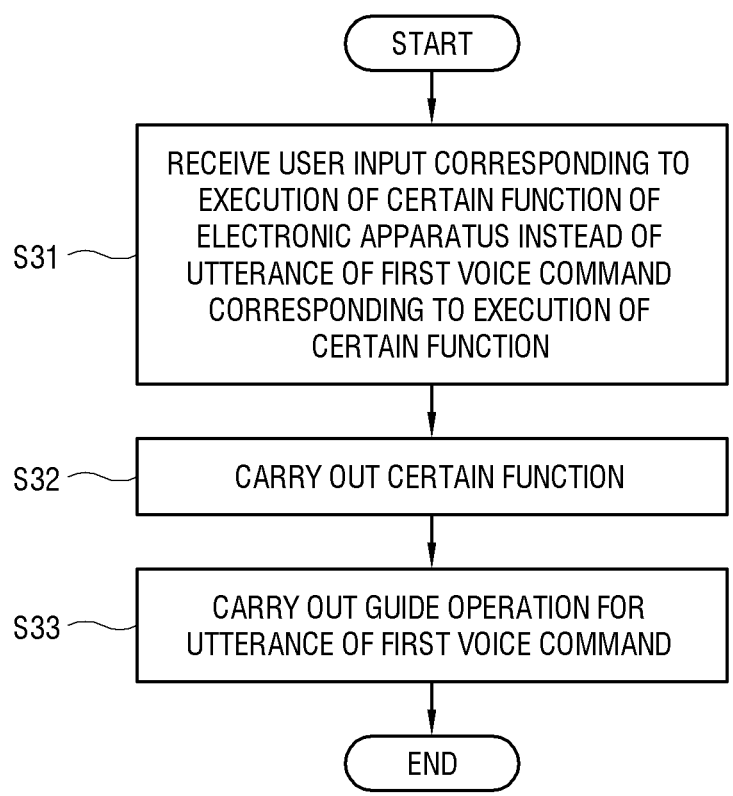
FIG. 3 is a flowchart showing a control method of an electronic apparatus according to an embodiment.

The operation of the processor 15 as above may be shown as in a flowchart of FIG. 3. As shown in FIG. 3, at an operation S31, the processor 15 first receives a user input corresponding to an execution of a certain function, instead of an utterance of a first voice command corresponding to the execution of the certain function. In other words, the operation S31 includes receiving the user input for executing the certain function by means besides voice.

Next, at an operation S32, the processor 15 controls the display to display an image of the certain function according to the user input. Here, the certain function may include, for example, an execution of a certain application, a detailed function execution of the certain application, an outer input conversion, a basic operation such as a channel operation, a volume operation or the like, an environment setting, a menu selection, etc. Also, the certain function is not limited to the above embodiment and may include all of various functions executable by voice commands and other input means.

Lastly, at an operation S33, the processor 15 carries out a guide operation for utterance of the first voice command. The guide operation, which provides an utterance method of the voice command corresponding to the certain function being executed, may include, for example, displaying a guide image 132, outputting a guide voice (see reference numeral 133 in FIG. 9), or the like.

According to the above operation flow, if the certain function is executed by means besides voice, the processor 15 may provide a useful guide, which can execute the certain function by the voice command, to the user.

On the other hand, the electronic apparatus 10 according to the embodiment may carry out the guide operation by downloading and executing instructions stored in a separate computer program product (not shown) instead that the processor 15 carries out the guide operation for utterance of the voice command.

As an embodiment, a computer program product includes a memory in which instructions are stored, and a processor. Here, when being executed by the processor, the instructions includes, based on a user input corresponding to an execution of a certain function of the electronic apparatus 10 being received instead of an utterance of a first voice command corresponding to the execution of the certain function, displaying an image of the certain function and carrying out a guide operation for utterance of the first voice command.

As an embodiment, the instructions may be configured to identify whether the guide operation should be carried out based on at least one of an utterance history of the first voice command or a performance history of the guide operation. Accordingly, voice use or guide provision histories may be managed, thereby providing the guide for voice service to the user in an appropriate circumstance.

Figure 4:
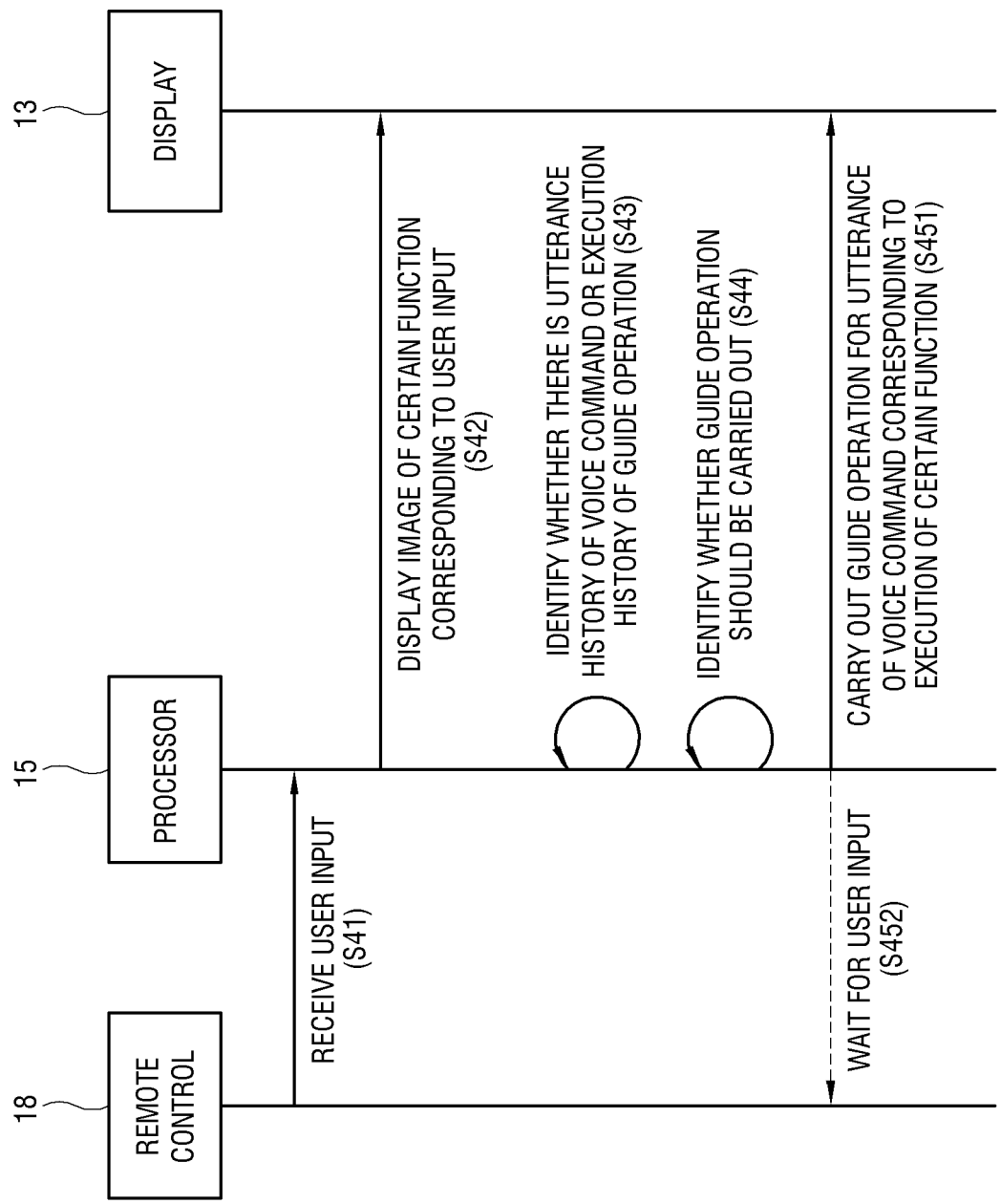
FIG. 4 is an example showing an operation flow among a processor, a display and a remote control in an electronic apparatus according to an embodiment.

FIG. 4 is an example showing an operation flow among a processor, a display and a remote control in an electronic apparatus according to an embodiment. The example shown in FIG. 4 shows a specific flow in which the processor 15 carries out the guide operation for utterance of the voice command according to the user input received from the remote control 18 from among configurations of the electronic apparatus 10 shown in FIG. 2.

First, at an operation S41, the processor 15 receives a user input from the remote control 18. At this time, the user input corresponds to a command for executing one of functions set with respect to buttons of the remote control 18 in advance from among a plurality of functions executable by the electronic apparatus 10.

Next, at an operation S42, the processor 15 displays an image of a certain function corresponding to the user input on the display 13.

At an operation S43, the processor 15 identifies whether there is an utterance history of a voice command or a performance history of a guide operation, which is related to the certain function. And then, at an operation S44, the processor 15 identifies whether the guide operation should be carried out based on at least one of the utterance history of the first voice command or the performance history of the guide operation.

As an example, when the user executes a motion mage application by a manipulation of the remote control, the electronic apparatus 10 may provide a guide for voice use if there is no history of the motion mage application previously executed by the voice command.

As another example, when the user executes the motion mage application by the manipulation of the remote control, if there is no history of the motion mage application previously executed by the voice command, but a number of times that the guide has been provided is more than a preset number of times, the electronic apparatus 10 may identify that the user does not have a will to use the voice command, and not provide the guide any more. However, even in this case, after a given time elapses, the electronic apparatus 10 may provide the guide again to make the user aware that she or he can use voice.

As an embodiment, when the user executes the motion mage application by the manipulation of the remote control, the electronic apparatus 10 may provide a guide for voice use if there is no history of the motion mage application previously executed by the voice command and a number of times that the motion mage application has been executed by the remote control is more than a preset number of times.

As another embodiment, when the user executes the motion mage application by the manipulation of the remote control, the electronic apparatus 10 may provide the guide again if there is a history of the motion mage application previously executed by the voice command, but a given time elapses after last voice is used.

Lastly, according to the identification about whether to carry out the guide operation identified at the operation S44, the processor 15 carries out an operation S451 or S452. To be more specific, if at the operation S44, the guide operation is identified to be carried out, the processor 15 carries out a guide operation for utterance of the voice command corresponding to the execution of the certain function at the operation S451. Also, if at the operation S44, the guide operation is identified not to be carried out, the processor 15 waits for a user input, which is received from the remote control 18, at the operation S452.

As an embodiment, if the voice command is not uttered even after the guide operation has been carried out with respect to the certain function, the electronic apparatus 10 may identify whether the guide operation should be continuously carried out or terminated based on a number of times that the certain function has been carried out by the user input.

As another embodiment, if the voice command is not uttered even after the guide operation has been carried out with respect to the certain function, the electronic apparatus 10 may identify whether the guide operation should be continuously carried out or terminated based on a number of times that the guide operation has been carried out.

As described above, in the shown examples, the operation flow has been explained with respect to, for example, a case of executing any one function, but the disclosure is not limited only thereto and may be applied to each of a plurality of functions providable by the electronic apparatus 10.

In other words, the electronic apparatus 10 may store and manage utterance histories of the voice command and performance histories of the guide operation with respect to each of the plurality of functions, and identify whether the guide operation should be carried out in an execution of each function based on the stored histories.

As an embodiment, if certain functions are carried out according to users, the electronic apparatus 10 may carry out different guide operations according to users. To be more specific, if the electronic apparatus 10 is used by a plurality of users, the electronic apparatus 10 identifies a user who is currently using it from among the plurality of users, and carries out a guide operation adapted to the identified user.

The electronic apparatus 10 may identify the user by using at least one of images photographed by a camera to recognize the user, viewing history information, interconnecting history information with certain mobile phones, history information about account login, or fingerprint recognition information.

With respect to the function that the user identified by the above methods executes, the electronic apparatus 10 may refer a number of times that the function has been carried out, a use history of the remote control, an utterance history of the voice command, an execution history of the guide operation, etc. to identify whether the guide operation for inducing the voice use should be carried out.

As described above, according to the embodiments, the electronic apparatus may manage the utterance history of the voice command and the execution history of the guide operation with respect to each of the plurality of functions according to users, and thus provide the guide for voice service every user at a proper time.

Figure 5:
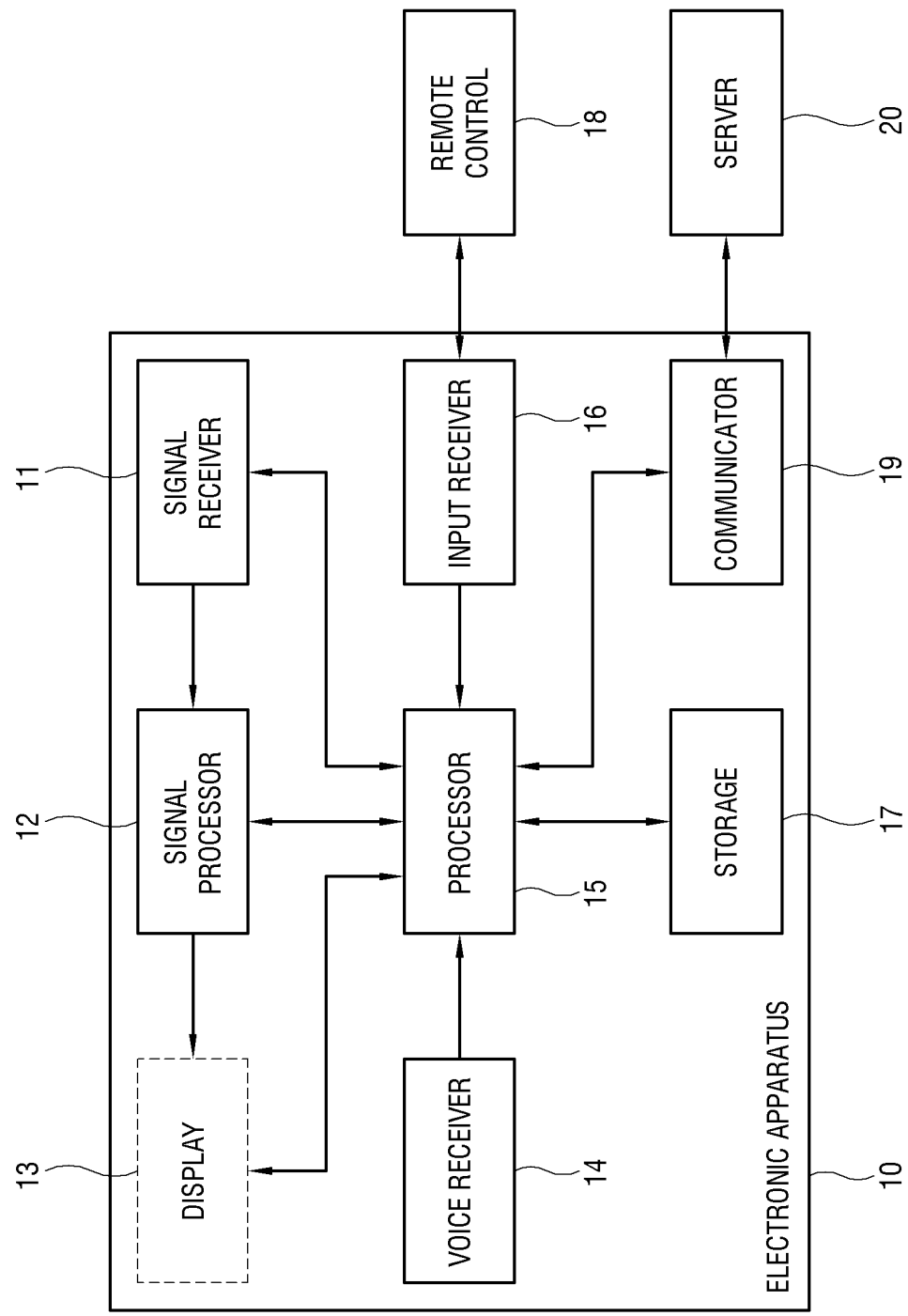
FIG. 5 is a block diagram showing an electronic apparatus, which communicate with a server, according to an embodiment.

FIG. 5 is a block diagram showing an electronic apparatus, which communicate with a server, according to an embodiment. As shown in FIG. 5, the electronic apparatus 10 includes all of constructions of the electronic apparatus shown in FIG. 2, and further includes a communicator 19 which communicate with a server 20. Accordingly, in the following description, specific explanations of the same configurations will be omitted and only the other configurations will be explained.

In the shown configurations, the communicator 19 communicates with the server 20 by wired or wireless. The communicator 19 may communicates with the server 20 in wired ways, such as Ethernet and the like, or via a wireless router in wireless ways, such as WiFi, Bluetooth, and the like. For example, the communicator 19 may be provided with a printed circuit board (PCB) including a wireless communication module, such as WiFi or the like. The communication methods of the communicator 19 are not limited thereto and the communicator 19 may be communicated with the server 20 by other communication methods.

The processor 15 communicates with the server 20 through the communicator 19, and controls the server 20 to carry out a portion or all of operations for carrying out the guide operation.

If receiving an user input from the input receiver 16 to execute the certain function from among a plurality functions providable by the electronic apparatus 10, the processor 15 controls the display 13 to display an image of the certain function thereon. Here, the user input may correspond, for example, an execution command of the certain function received from the remote control 18.

As an embodiment, if the image of the certain function is displayed according to the user input, the processor 15 transmits identification information of the certain function to the server 20. The server 20 may store a utterance history of the voice command or an execution history of the guide operation with respect to each of the plurality functions executable by the electronic apparatus 10, and the processor 15 may receive information about the utterance history of the voice command or the execution history of the guide operation corresponding to the transmitted identification information of the certain function from the server 20.

In this case, the processor 15 may identify whether the guide operation for utterance of the voice command with respect to the certain function should be carried out based on the history information received from the server 20.

As another embodiment, if the image of the certain function is displayed according to the user input, the processor 15 may transmit information about at least one of the utterance history of the voice command or the execution history of the guide operation with respect to the certain function, which is stored in the storage 17, to the server 20. The server 20 may store information about an utterance examples of the voice command corresponding to each of the plurality functions executable by the electronic apparatus 10, and the processor 15 may receive the information about utterance example of the voice command corresponding to the transmitted history information from the server 20.

In this case, the processor 15 may provide the guide operation for the certain function by using the information about utterance example of the voice command received from the server 20.

As described above, according to the embodiments, if carrying out the guide operation for utterance of the voice command with respect to the certain function, the electronic apparatus 10 may be embodied, so that the server 20 processes a portion or all thereof.

Figure 6:
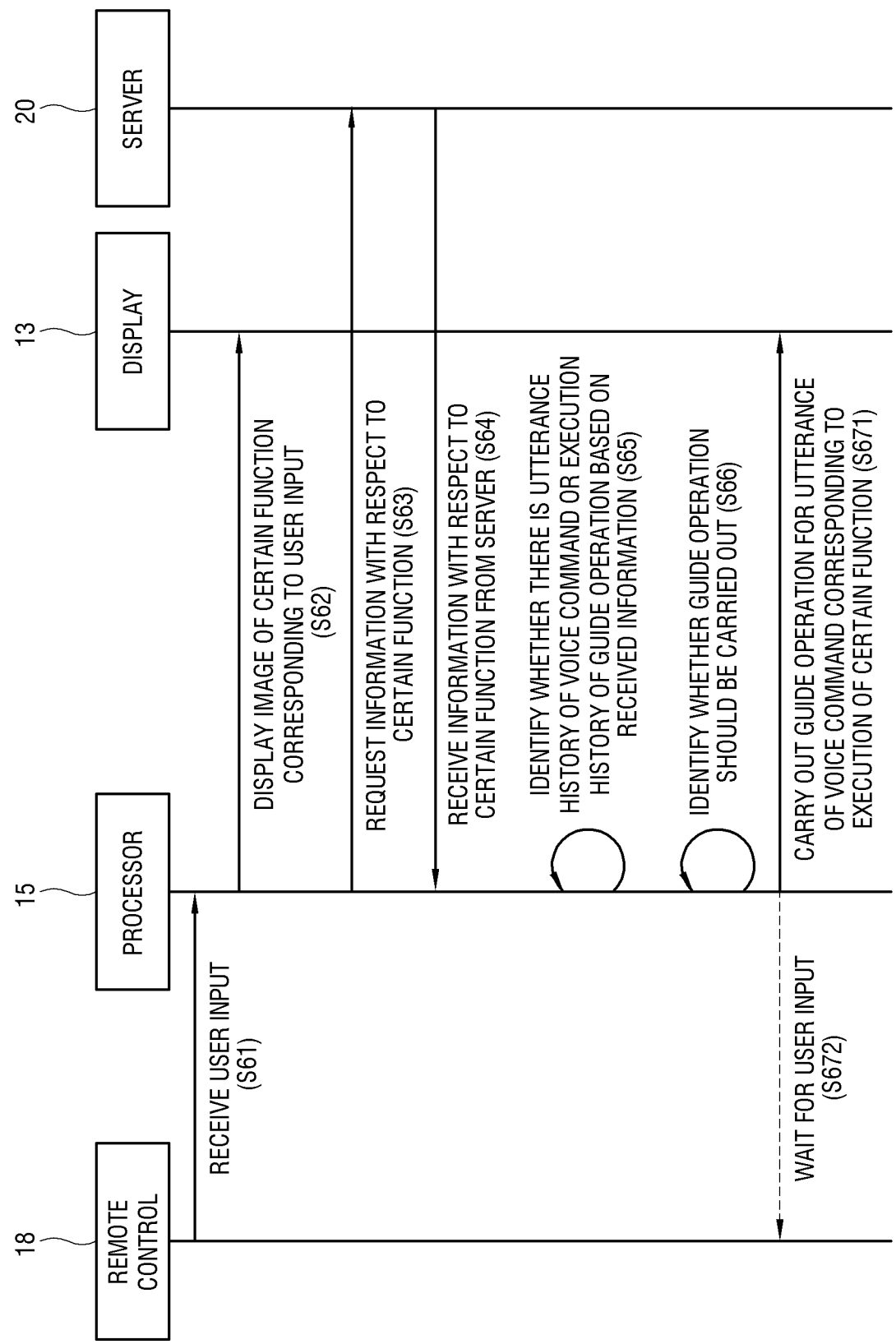
FIG. 6 is an example showing an operation flow among a server and a processor, a display and a remote control in an electronic apparatus according to an embodiment.

In the configuration of FIG. 5, a flow of operation of the processor 15 according to an exemplary may be shown as in FIG. 6.

FIG. 6 is an example showing an operation flow among a server and a processor, a display and a remote control in an electronic apparatus according to an embodiment. As shown in FIG. 6, first, at an operation S61, the processor 15 receives a user input from the remote control 18, and at an operation S62, displays an image of a certain function corresponding to the received user input on the display 13.

Next, at an operation S63, the processor 15 requests information with respect to the certain function to the server 20. At this time, the operation S63 may include transmitting identification information of the certain function.

At an operation S64, the processor 15 receives the information with respect to the certain function from the server 20. Here, the operation S64 may include receiving, from the server 20, information corresponding to the transmitted identification information of the certain function from among information about an utterance history of a voice command or a performance history of a guide operation with respect to each of a plurality of functions of the electronic apparatus 10 stored in the server 20.

Next, at an operation S65, the processor 15 identifies whether there is the utterance history of the voice command or the performance history of the guide operation based on the information received from the server 20, and at an operation S66, identifies whether a guide operation for utterance of the voice command with respect to the certain function should be carried out.

Lastly, according to the identification about whether to carry out the guide operation identified at the operation S66, the processor 15 carries out an operation S671 or S672. To be more specific, if at the operation S66, the guide operation is identified to be carried out, the processor 15 carries out the guide operation for utterance of the voice command corresponding to the execution of the certain function at the operation S671. Also, if at the operation S66, the guide operation is identified not to be carried out, the processor 15 waits for a user input, which is received from the remote control 18, at the operation S672.

Figure 7:
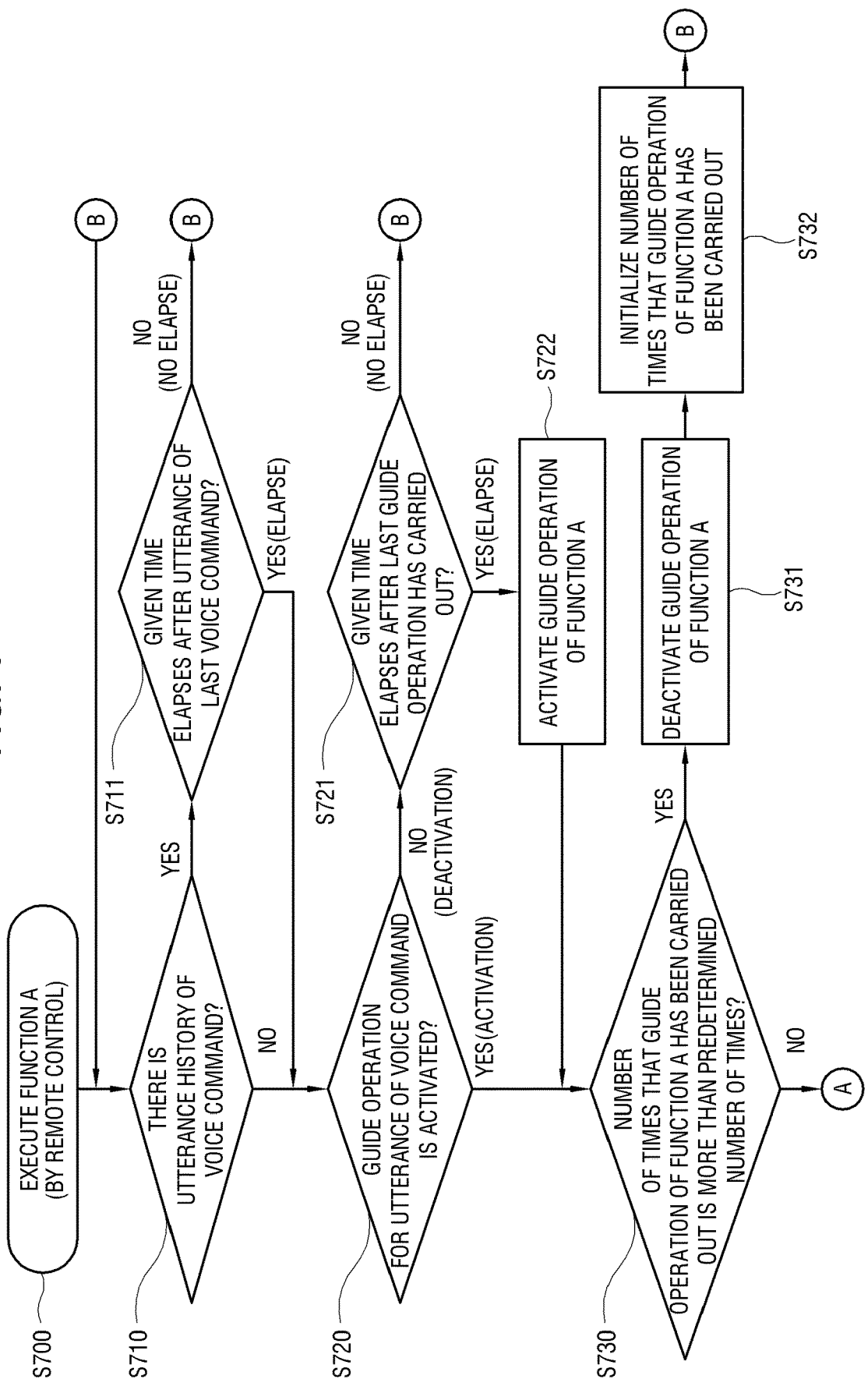
FIGS. 7 and 8 are flowcharts showing an operation flow of an electronic apparatus, which carries out a guide operation with respect to an execution of a certain function, according to an embodiment.
Figure 8:
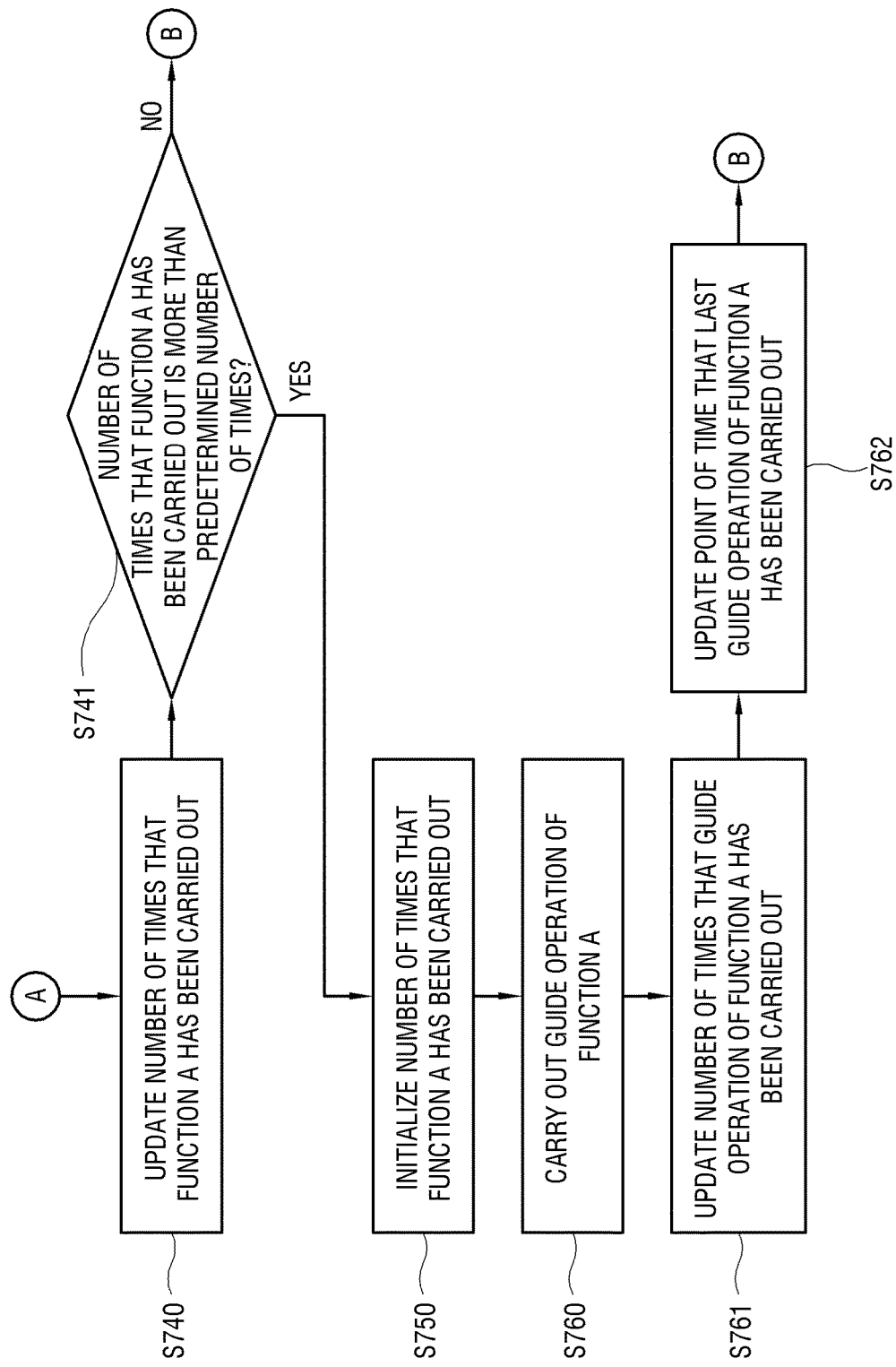

FIGS. 7 and 8 are flowcharts showing an operation flow of an electronic apparatus, which carries out a guide operation with respect to an execution of a certain function, according to an embodiment. As shown in the drawings, first, at an operation S700, the electronic apparatus 10 according to the embodiment executes a 'function A' from among a plurality of executable functions according to a user input by a remote control.

Next, at an operation S710, the electronic apparatus 10 identifies whether there is an utterance history of a voice command with respect to the function A. As the identified result of the operation S710, if there is the utterance history of the voice command, at an operation S711, the electronic apparatus 10 identifies whether a given time elapses after an utterance of last voice command. Here, if identifying that the given time does not elapse, at an operation S700, the electronic apparatus 10 waits for an execution of the function A by the remote control, and if identifying that the given time elapses, carries out an operation S720.

As the identified result of the operation S710, even if there is no utterance history of the voice command, the electronic apparatus 10 carries out the operation S720.

At the operation S720, the electronic apparatus 10 identifies whether the guide operation for utterance of the voice command with respect to the function A is enabled or activated. Here, if identifying that the guide operation is activated, the electronic apparatus 10 carries out an operation S730, and if identifying that the guide operation is not activated, at an operation S721, identifies whether a given time elapses after a last guide operation has carried out.

As the identified result of the operation S721, if the given time elapsed after the last guide operation has been carried out, at an operation S722, the electronic apparatus 10 activates the guide operation of the function A, and then carries out the operation S730. However, if the given time did not elapse after the last guide operation has been carried out, at an operation S700, the electronic apparatus 10 waits for the execution of the function A by the remote control.

At the operation S730, the electronic apparatus 10 identifies whether a number of times that the guide operation of the function A has been carried out is more than a predetermined number of times. Here, if the number of times that the guide operation of the function A has been carried out is more than the predetermined number of times, at an operation S731, the electronic apparatus 10 deactivates the guide operation of the function A, and at an operation S732, initializes the number of times that the guide operation of the function A has been carried out. After that, at the operation S700, the electronic apparatus 10 waits for the execution of the function A by the remote control.

As the identified result of the operation S730, if the number of times that the guide operation of the function A has been carried out is not the predetermined number of times, at an operation S740, the electronic apparatus 10 updates a number of times that the function A has been carried out and at an operation S741, identifies whether the number of times that the function A has been carried out is more than a predetermined number of times.

As the identified result of the operation S741, if the number of times that the function A has been carried out is not more than the predetermined number of times, at an operation S700, the electronic apparatus 10 waits for the execution of the function A by the remote control. However, if the number of times that the function A has been carried out is more than the predetermined number of times, at an operation S750, the electronic apparatus 10 initializes the number of times that the function A has been carried out, and then, at the operation S760, carries out the guide operation for utterance of the voice command with respect to the function A.

After carrying out the guide operation, at an operation S761, the electronic apparatus 10 updates a number of times that the guide operation of the function A has been carried out, and at an operation S762, update a point of time that last guide operation of the function A has been carried out. After that, at the operation S700, the electronic apparatus 10 waits for the execution of the function A by the remote control.

As described above, the electronic apparatus 10 according to the embodiment may carry out the guide operation, which induces the voice use to the user at a proper time, by using at least one of the utterance history of the voice command or the execution history of the guide operation.

Figure 9:
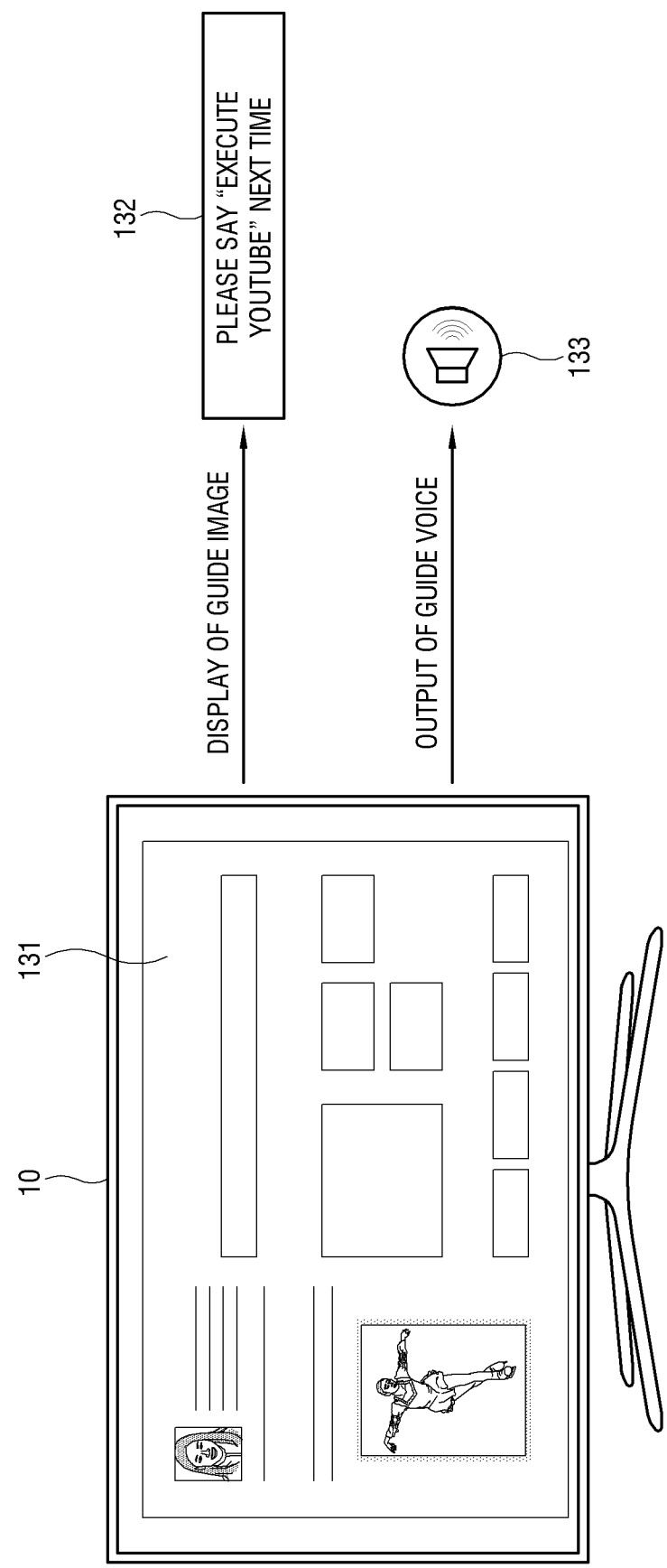
FIG. 9 shows an example carrying out the guide operation to the execution of the certain function according to an embodiment.

FIG. 9 shows an example carrying out the guide operation to the execution of the certain function according to an embodiment. In the shown example, the electronic apparatus 10 displays, for example, an image 131 of a certain function, such as an execution screen of an motion image playback application, according to a user input by, for example, a manipulation of remote control, which is not voice. Here, the certain function may include detailed function performances of a specific application such as the motion image playback application or the like, outer input conversions, basic operations such as channel operation, volume operation and the like, environment settings, menu selections, etc. besides the execution of the specific application.

If the image 131 of the certain function such as the execution screen of the motion image playback application is displayed, the electronic apparatus 10 carries out a guide operation, which guides that the motion image playback application can be executed by a voice command to the user. The guide operation may include a display of a guide image 132, an output of a guide voice 133, or the like, and may provide, for example, an utterance example sentence, which allows the user to know how to execute the motion image playback application with the voice.

Figure 10:
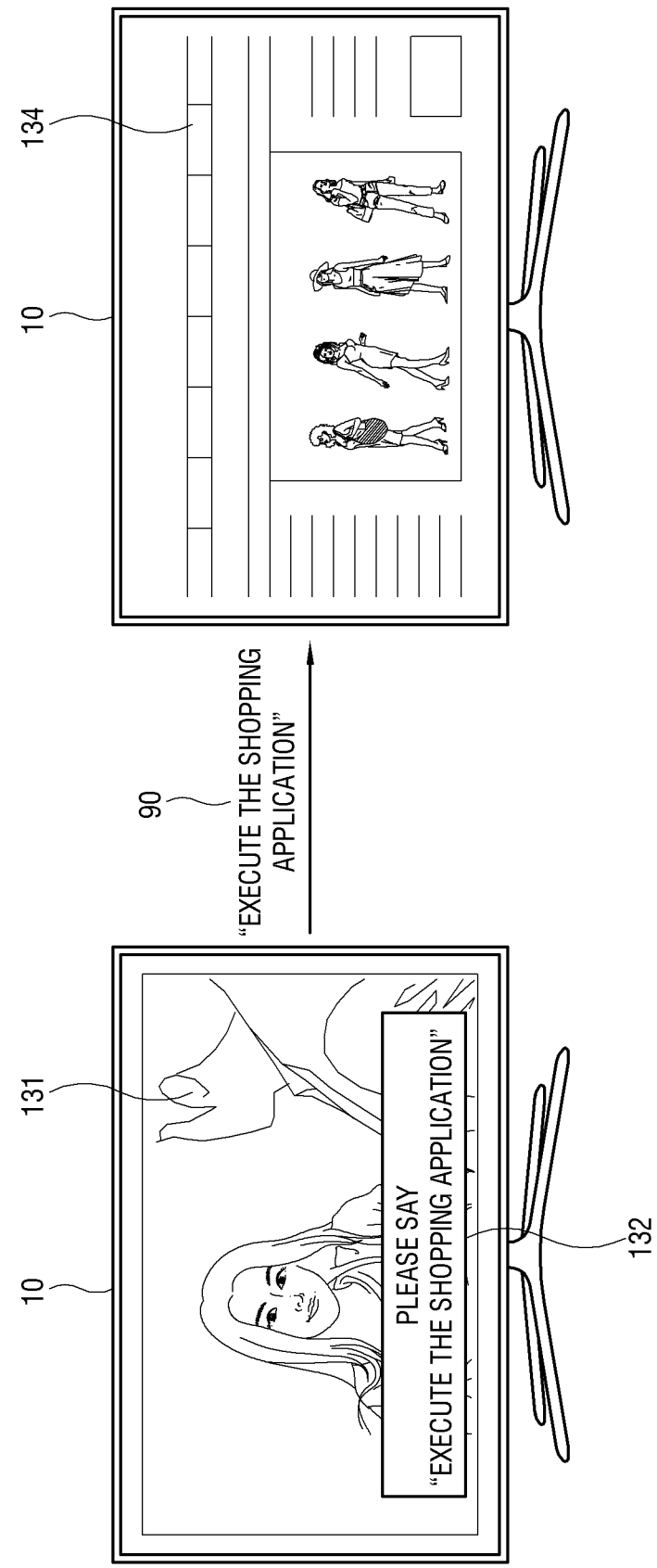
FIG. 10 shows another example carrying out the guide operation to the execution of the certain function according to an embodiment.

FIG. 10 shows another example carrying out the guide operation with respect to the execution of the certain function according to an embodiment. In the shown example, the electronic apparatus 10 displays, for example, an image 131 of a first function, such as a 'drama' image or the like, according to a user input by, for example, a manipulation of remote control, which is not voice. At this time, the electronic apparatus 10 may refer an utterance history of the voice command of the user and an execution history of the guide operation with respect to the 'drama' image to carry out the guide operation.

For example, if there is no history that the user has uttered the voice command to watch the 'drama' image and a number of times that the user has executed a 'shopping application' while watching the 'drama' image is more than a predetermined number of times, the electronic apparatus 10 may display a guide image 132 including an utterance example of 'Please say "execute the shopping application"' as an guide operation therein in one area of the 'drama' image.

At this time, if the user utters "execute the shopping application" 90 by referring to the guide image 132 provided in the display screen, an image 134 of a second function, such as an execution screen of the 'shopping application', may be displayed in the display screen.

As above, the electronic apparatus 10 according to the embodiments may provide the guide image 132, which refers to the utterance history of the voice command and the watching history with respect to the image 131 of the first function which is currently executed, and thus induces so that the user executes the image 134 of the second function having high possibility of execution by using the voice after watching the image 131 of the first function.

As described above, the electronic apparatus 10 according to the embodiments may provide the guide, which induces the utterance of proper voice command so that the user executes the function which is currently executed or the function having high possibility of execution by using the voice.

Although the present disclosure has been described with various embodiments, various changes and modifications may be suggested to one skilled in the art. It is intended that the present disclosure encompass such changes and modifications as fall within the appended claims.

The invention claimed is:

1. An electronic apparatus comprising:
an input receiver configured to receive a user input;
a voice receiver configured to receive a voice command;
a processor configured to control to:
based on a user input corresponding to an execution of a certain function of the electronic apparatus being received through the input receiver, carry out the certain function,
carry out a guide operation for the utterance of the first voice command corresponding to the execution of the certain function,
based on an utterance history of the first voice command, identify whether a given time elapses after a last utterance of the first voice command is received, and
based on the given time elapsing, carry out the guide operation for the utterance of the first voice command.

2. The apparatus according to claim 1, wherein the processor is configured to identify whether the guide operation is to be carried out based on at least one of the utterance history of the first voice command or a performance history of the guide operation.

3. The apparatus according to claim 2, wherein the processor is configured to identify the utterance history of the first voice command or the performance history of the guide operation according to users.

4. The apparatus according to claim 2, further comprising a communicator configured to communicate with a server,
wherein the processor is configured to, based on information received from the server, identify whether there is the utterance history of the first voice command or the performance history of the guide operation.

5. The apparatus according to claim 2, further comprising a communicator configured to communicate with a server,
wherein the processor is configured to transmit information on the at least one of the utterance history of the first voice command or the performance history of the guide operation to the server.

6. The apparatus according to claim 1, wherein the processor is configured to, based on the first voice command being not uttered after the performance of the guide operation, identify whether the guide operation is to be continuously carried out or terminated based on a number of times that the certain function has been carried out by the user input.

7. The apparatus according to claim 1, wherein the processor is configured to, based on the first voice command being not uttered after the performance of the guide operation, identify whether the guide operation is to be continuously carried out or terminated based on a number of times that the guide operation has been carried out.

8. The apparatus according to claim 1, wherein the processor is configured to identify a number of times that the certain function has been carried out by the user input or a number of times that the guide operation has been carried out.

9. The apparatus according to claim 1, further comprising a display,
wherein the processor is configured to, based on the user input corresponding to the execution of the certain function being received, control the display to display an image of the certain function.

10. A computer program product comprising:
a memory configured to store instructions; and
a processor,
wherein when being executed by the processor, the instructions are configured to, based on a user input corresponding to an execution of a certain function of the electronic apparatus being received through an input receiver,
carry out the certain function,
carry out a guide operation for the utterance of the first voice command corresponding to the execution of the certain function,
based on an utterance history of the first voice command, identify whether a given time elapses after a last utterance of the first voice command is received, and
based on the given time elapsing, carry out the guide operation for the utterance of the first voice command.

11. A control method of an electronic apparatus comprising:
receiving a user input corresponding to an execution of a certain function of the electronic apparatus through an input receiver;
carrying out the certain function;

carrying out a guide operation for the utterance of the first voice command corresponding to the execution of the certain function, based on an utterance history of the first voice command, identify whether a given time elapses after a last utterance of the first voice command is received, and based on the given time elapsing, carry out the guide operation for the utterance of the first voice command.

12. The method according to claim 11, wherein the carrying out the guide operation comprises identifying whether the guide operation is to be carried out based on at least one of a utterance history of the first voice command or a performance history of the guide operation.

13. The method according to claim 11, further comprising:

based on the first voice command being not uttered after the performance of the guide operation, identifying whether the guide operation is to be continuously carried out or terminated based on a number of times that the certain function has been carried out by the user input.

14. The method according to claim 11, further comprising:

based on the first voice command being not uttered after the performance of the guide operation, identifying whether the guide operation is to be continuously carried out or terminated based on a number of times that the guide operation has been carried out.

* * * * *